(12) United States Patent
Cannon et al.

(10) Patent No.: US 6,726,332 B2
(45) Date of Patent: Apr. 27, 2004

(54) TIR PRISM FOR DMD PROJECTOR (75) Inventors: Bruce L. Cannon, Portland, OR (US); Peter R. Oehler, Aloha, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/302,183

(22) Filed: Nov. 22, 2002

(65) Prior Publication Data

US 2003/0099008 A1 May 29, 2003

Related U.S. Application Data (60) Provisional application No. 60/334,009, filed on Nov. 28, 2001.

(51) Int. Cl.⁷ .................. G03B 21/00; G03B 21/26; G03B 21/14; G03B 21/28; G03B 21/56
(52) U.S. Cl. .............. 353/33; 353/34; 353/37; 353/38; 353/47; 353/50; 353/81; 359/460; 359/449; 348/771; 362/268; 362/290; 362/337; 362/339
(58) Field of Search .............. 353/33–34, 37–38, 353/50, 81; 359/443, 460, 448–449; 348/771; 362/268, 290, 337, 339

(56) References Cited

U.S. PATENT DOCUMENTS

| | | | |
|---|---|---|---|
| 5,552,922 A | 9/1996 | Magarill | 353/81 |
| 5,604,624 A | 2/1997 | Magarill | 353/81 |
| 5,999,306 A | 12/1999 | Atobe et al. | 359/223 |
| 6,155,687 A * | 12/2000 | Peterson | 353/84 |
| 6,185,047 B1 * | 2/2001 | Peterson et al. | 359/640 |
| 6,249,387 B1 | 6/2001 | Poradish et al. | 359/638 |
| 6,250,763 B1 * | 6/2001 | Fielding et al. | 353/31 |
| 6,349,006 B1 * | 2/2002 | Okamori et al. | 359/834 |
| 6,375,330 B1 * | 4/2002 | Mihalakis | 353/31 |
| 6,377,306 B1 | 4/2002 | Johnson et al. | 348/744 |
| 6,452,728 B2 | 9/2002 | Shikama | 359/663 |
| 6,461,000 B1 | 10/2002 | Magarill | 348/771 |
| 6,471,356 B1 * | 10/2002 | Gohman et al. | 353/33 |
| 6,588,908 B2 * | 7/2003 | Shimizu | 353/81 |
| 2002/0180934 A1 | 12/2002 | Shimizu | 343/30 |

* cited by examiner

*Primary Examiner*—Russell Adams
*Assistant Examiner*—Magda Cruz
(74) *Attorney, Agent, or Firm*—Maurice M. Klee; Bruce E. Black (57) ABSTRACT

A light engine (9) for a projection display is provided which employs: 1) at least one light source (25), 2) at least one TIR prism assembly (13), and 3) at least one digital micromirror device (15), wherein: (a) the illumination path (55) between the light source (25) and the prism assembly (13) is unfolded, i.e., the illumination path is free of fold mirrors; and (b) the angle γ between the illumination path (55) and the device's horizontal axis (53) is preferably less than or equal to about 20°.

16 Claims, 12 Drawing Sheets

FIG. 1A  FIG. 1B

PRIOR ART

PRIOR ART

FIG. 2

PRIOR ART

FIG. 3

PRIOR ART

FIG. 4

PRIOR ART

PRIOR ART

PRIOR ART

TIR PRISM FOR DMD PROJECTOR

CROSS REFERENCE TO RELATED PROVISIONAL APPLICATION

This application claims the benefit under 35 USC §119(e) of U.S. Provisional Application No. 60/334,009, filed Nov. 28, 2001, the contents of which are incorporated herein in their entirety.

FIELD OF THE INVENTION

This invention relates to micro-display projection systems and, in particular, to micro-display projection systems that use a digital micromirror device (DMD) and a TIR prism.

BACKGROUND OF THE INVENTION

A. Prior Art Projection Displays Employing DMDs

As known in the art, a digital micromirror device (DMD) comprises a panel which selectively reflects illumination light to produce image light, said panel comprising a plurality of selectively adjustable reflecting elements arranged in a common plane, said elements being adjustable between at least a first position and a second position.

A typical projection display using a DMD (e.g., a DMD from TEXAS INSTRUMENTS) has illumination from a light source (e.g., a high pressure mercury arc lamp), a color wheel for field sequential color, and an illumination path that has an integrator and relay optics. The illumination light from the light source strikes the imager display and is modulated by the micro-mirrors at each pixel. Each flipping mirror can direct the illumination reflected from its surface so that it goes towards the projection lens and screen or off into a reject state where it is blocked from getting to the screen.

There are a number of ways to keep the incident illumination bundle of light separated from the outgoing imaging light, i.e., the light that gets to the screen. The first uses physical separation of the illumination bundle and the imaging bundle. The pupil in the projection lens is then located so as to accept light from pixels that are turned "on" and reject light from any other direction.

The second method uses a TIR prism to separate the illumination light from the imaging light reflected from the DMD imager. A TIR prism has a face that is close to the critical angle of reflection, i.e., it has a face at which light at some angles undergoes total internal reflection and light at other angles passes through the face. The original disclosure of the use of a TIR prism with a DMD imager was in commonly-assigned U.S. Pat. No. 5,552,922 to Simon Magarill. Other patents in which TIR prisms are used with DMD imagers include: Magarill, U.S. Pat. No. 5,604,624; Peterson et al., U.S. Pat. No. 6,185,047; Poradish et al., U.S. Pat. No. 6,249,387; Fielding et al., U.S. Pat. No. 6,250,763; Okamori et al., U.S. Pat. No. 6,349,006; and Magarill, U.S. Pat. No. 6,461,000.

In what has now become the standard configuration for TIR prisms used with DMD imagers, the illumination light comes in at an angle that "totally reflects", while in the imaging path, the light that goes to the screen passes through the TIR surface without any reflections. Again, the pupil in the projection lens is located so as to accept light from pixels that are turned "on" and reject light, if any, from other directions.

Figure 1A:
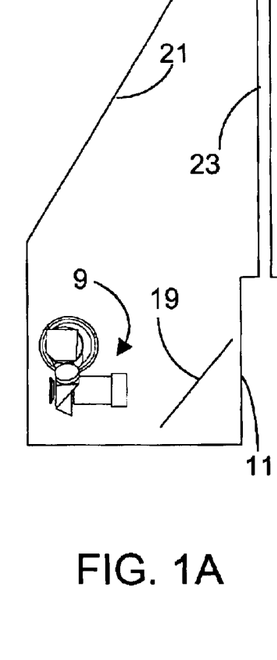
FIGS. 1A and 1B are side and front views, respectively, showing a typical prior layout for a rear projection television employing a DMD.
Figure 1B:
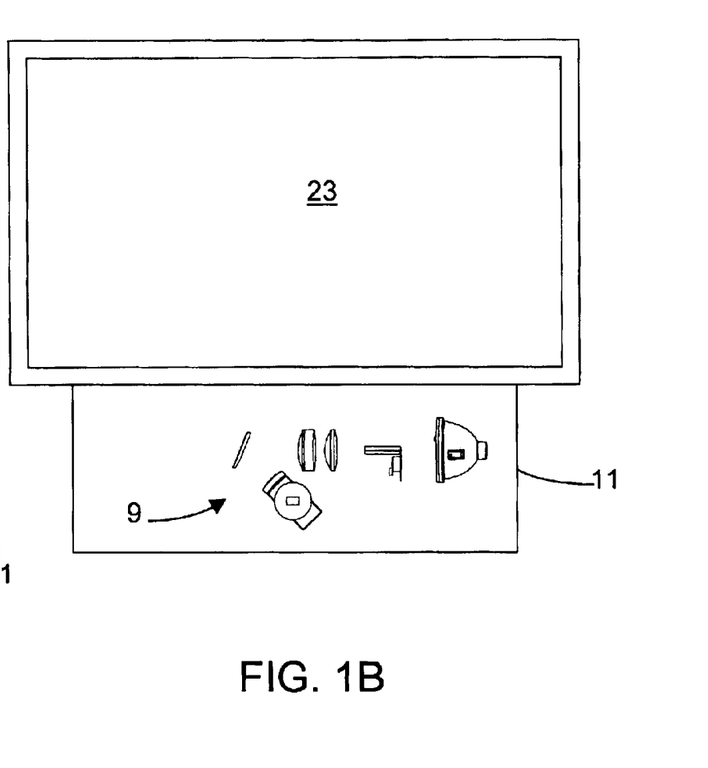
Figure 2:
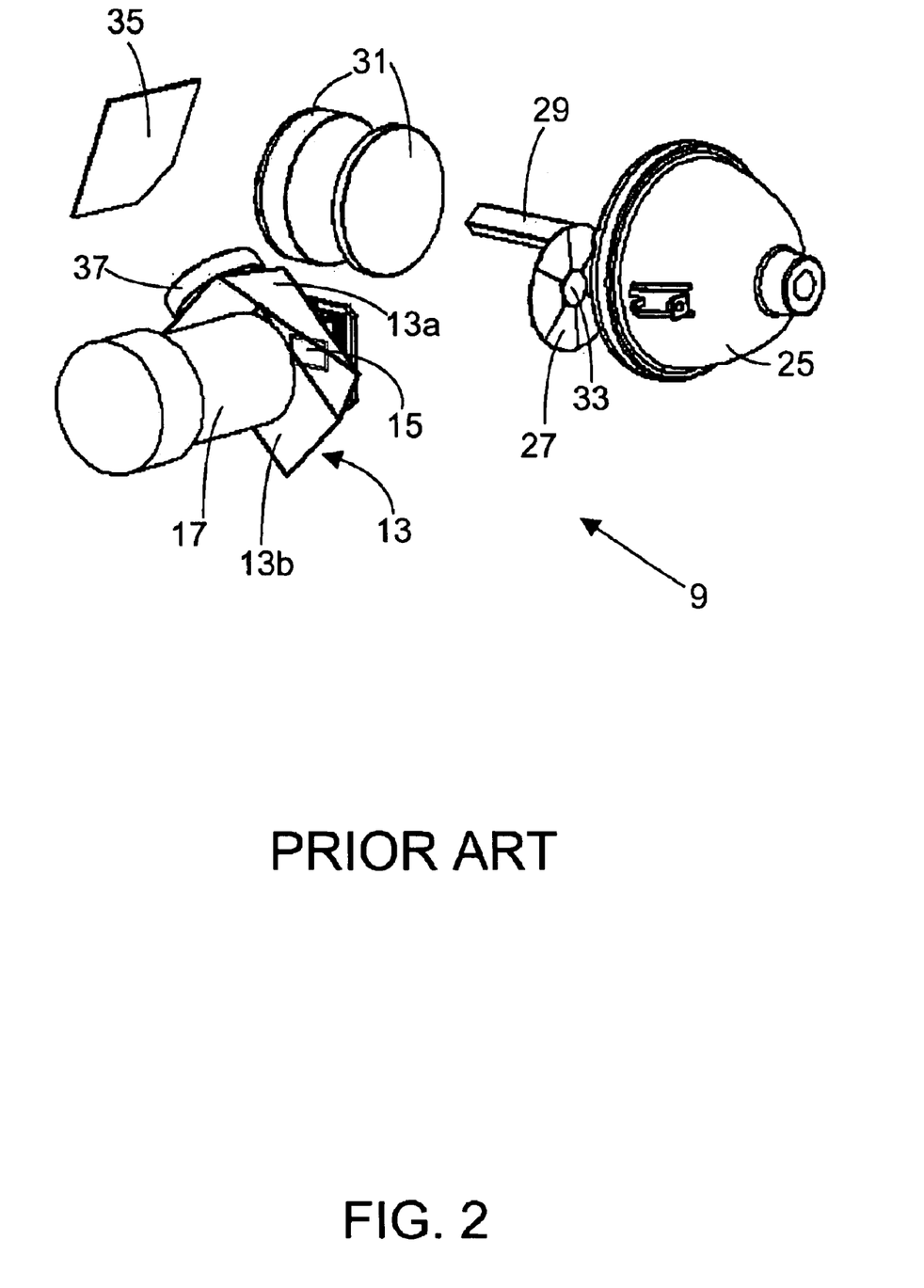
FIG. 2 is an isometric view of the light engine components of the prior art DMD projection television of FIG. 1.

FIGS. 1A and 1B are side and front views, respectively, showing a DMD projection system 9 inside a rear-projection cabinet 11. FIG. 2 is an isometric close-up of the same elements, without the cabinet. These two figures represent the elements that one would find in the cabinet of a rear projection television which uses a DMD and a TIR prism assembly typical of the prior art.

As shown in these figures, prism assembly 13 sits in front of DMD imager 15. Projection lens 17 selects the imaging light and sends it to fold mirrors 19, 21 and then to screen 23. All the parts of a prior art Illumination system can be seen in the figures, namely, a light source 25 (e.g., a high pressure mercury arc lamp), a color wheel 27 with motor 33, an integrating tunnel 29, relay lenses 31, a fold mirror 35, and a further relay lens 37.

B. Operation and Orientation of Illumination Light, Imaging Light, and TIR Surface in the Prior Art On all DMD imagers produced to date, the square pixel micro-mirrors tilt about their corners. This means that the illumination light needs to come at the device at 45 degrees to the device's horizontal (see discussion below).

Figure 3:
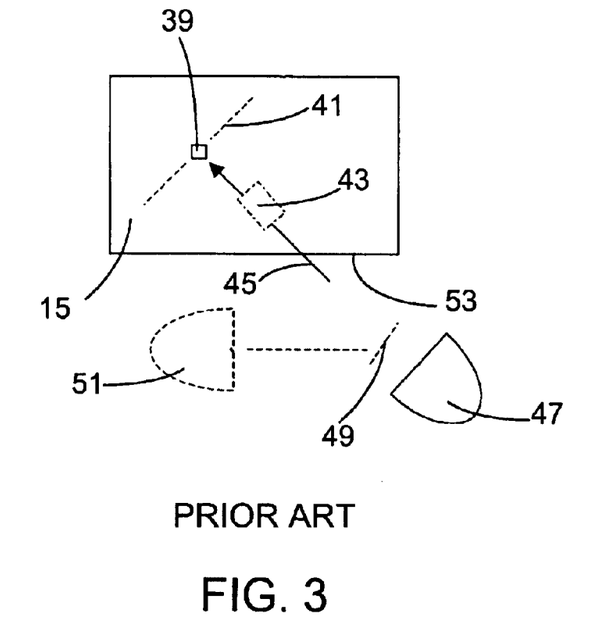
FIG. 3 is a front view of a DMD imager illustrating the use of a fold mirror in prior art illumination paths to achieve a "desirable" lamp orientation.

FIG. 3 is a front view of a DMD imager which illustrates how the 45 degree requirement has been achieved in the prior art. In this figure, 39 is a single micro-mirror pixel, 41 shows the mirror flipping axis (axis of motion), 43 illustrates the TIR surface reflection, 45 shows the illumination direction, 47 shows an "undesirable" light source orientation (see discussion below), 49 shows the illumination-path fold mirror used in the prior art, and 51 shows the "desirable" light source orientation achieved in the prior art through the use of the illumination-path fold mirror (see discussion below).

To interact properly with the micro-mirrors, the illumination light has to come in perpendicular to flipping axis 41. As a result, illumination direction 45 ends up being at 45° to the horizontal axis 53 of the imager 15, i.e., the horizontal axis defined by the imager's horizontal edges. In a system that uses a TIR prism, the air gap surface is inclined across this same imager axis.

Without fold mirror 49, the illumination axis 45 will go all the way back to the start of the illumination, i.e., to light source 47 in its "undesirable" orientation in FIG. 3. For many light sources and, in particular, for light sources which employ an arc burner (e.g., high pressure mercury arc lamps), operation of the source is impaired if the arc burner is not substantially horizontal. It is for this reasons that the orientation of light source 47 in FIG. 3 is considered "undesirable."

As shown in FIG. 3, in the prior art, the need for a substantially horizontal orientation for the light source's axis was achieved by the use of an illumination-path fold mirror 49. This mirror allowed the light source 51 to have an orientation such that the angle of the source's axis relative to the horizontal axis 53 of imager 15 was acceptable.

Figure 4:
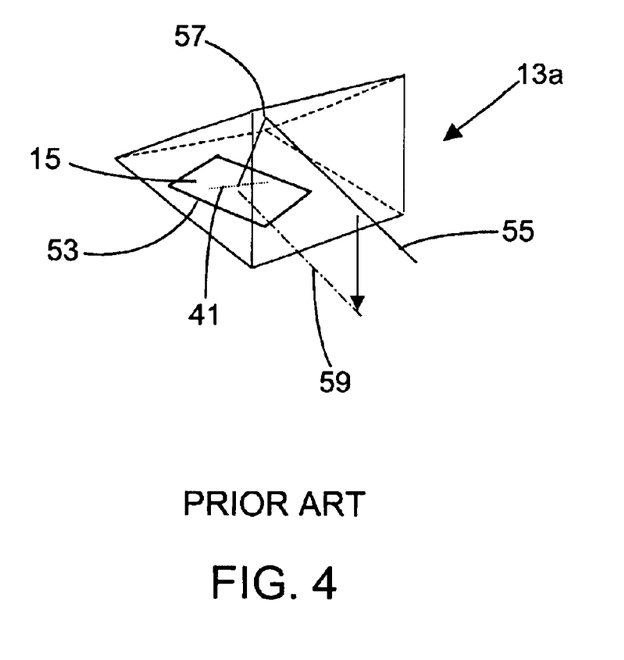
FIG. 4 is an isometric view showing an illumination light path used in the prior art.

FIG. 4 is a further illustration of the use of TIR prisms in the prior art, in this case, an isometric view of just one of the prisms 13a making up prism assembly 13, with DMD imager 15 being shown below the prism in this figure. In actual use, the DMD imager 15 and the prism assembly will typically be located vertically.

FIG. 4 shows the illumination axis 55 coming into the prism 13a and reflecting down to the device at the TIR surface 57. For illustration, a projection 59 of the illumination axis on the plane of the device is shown as a dashed line in FIG. 4. Note that that the projection is at 45 degrees to the horizontal axis 53 of the imager. FIG. 4 also shows flipping axis 41 which again is at 45 degrees to the horizontal axis 53 of the imager. If the positive direction of the horizontal axis is to the right in FIG. 4, then the flipping axis is at +45°, while the projection 59 of the illumination axis is at −45°.

Figure 5A:
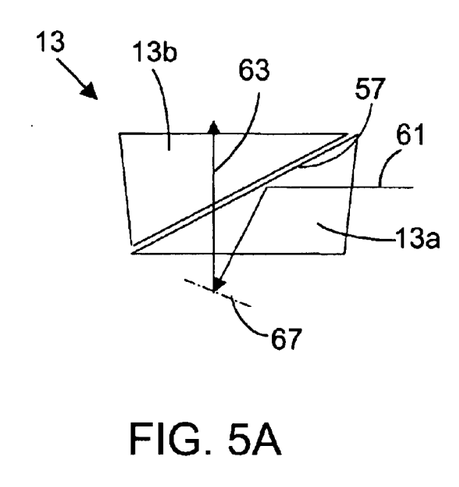
FIGS. 5A, 5B, and 5C are schematic diagrams showing illumination and image light paths for three prism assembly configurations used in the prior art.
Figure 5B:
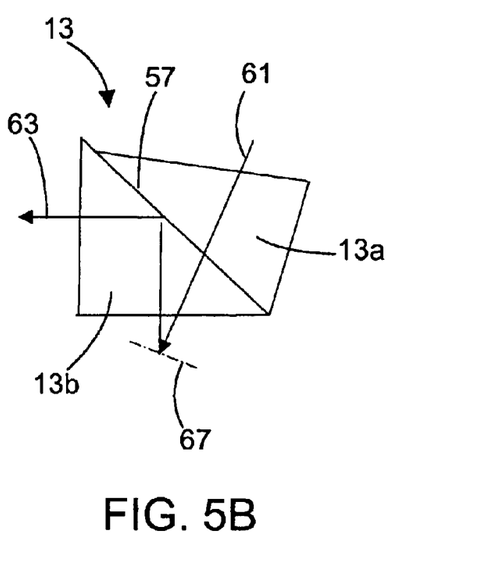
Figure 5C:
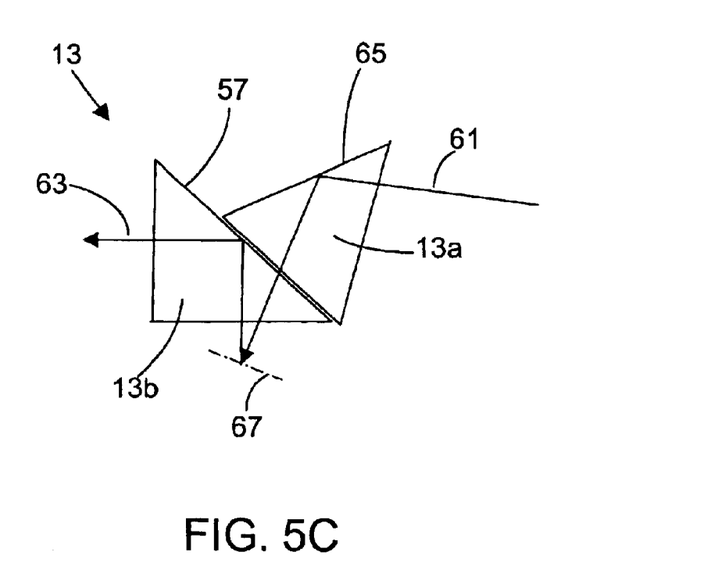

FIGS. 5A, 5B, and 5C illustrate light paths through various TIR prism assemblies used in the prior art, where in each figure a single micro-mirror 67 in its "on" state (+10 degrees) is shown.

FIG. 5A shows the case where illumination light 61 reflects from TIR surface 57 and imaging light 63 passes through the TIR surface. For a prism composed of acrylic (n=1.493) and for a DMD device with a 10 degree mirror tilt and a F/3.0 light cone, the prism angle is about 35 degrees.

FIG. 5B shows the case where illumination light 61 passes through TIR surface 57 and imaging light 63 reflects from the TIR surface. The mirrors of the imaging device operate in the same manner for this approach as for the approach of FIG. 5A. Thus, the illumination still has to come in at an angle for the tilted "on-state" mirrors and the imaging (on-state) light still comes straight up off the device (normal to the device plane). To satisfy these conditions, the prisms making up the prism assembly have different configurations for the FIG. 5B approach than for the FIG. 5A approach.

In particular, for the FIG. 5B approach, the prism angle is different from that of the FIG. 5A approach because the imaging light coming straight up needs to be totally reflected at the TIR surface. For example, for an acrylic prism and a DMD device with a 10 degree mirror tilt and a F/3.0 light cone, the TIR prism face for the FIG. 5B approach is at a simple 45 degrees to the device plane, rather than at 35 degrees as in the FIG. 5A approach.

FIG. 5C shows a further approach where the optical paths for both the illumination light and the imaging light undergo total internal reflection. In this case, total internal reflection occurs at both surface 57 and surface 65. Otherwise, this approach is like that of FIG. 5B. In particular, as shown in Peterson et al., U.S. Pat. No. 6,185,047, the approach of FIG. 5C, like the approach of FIG. 5B (and FIG. 5A), has employed a fold mirror in the illumination path.

SUMMARY OF THE INVENTION

From the foregoing, it can be seen that in the prior art, DMD projection displays which have employed TIR prism assemblies have included a fold mirror in the illumination path. The present invention addresses this deficiency in the art and provides a projection display which employs: 1) at least one light source, 2) at least one TIR prism assembly, and 3) at least one digital micromirror device, wherein the illumination path between the light source and the prism assembly is unfolded, i.e., the illumination path is free of fold mirrors.

Such an unfolded light path not only simplifies the illumination path but also reduces its length. The reduction in length, in turn, allows smaller and/or fewer relay lenses to be used in the illumination path. This reduces the cost, complexity, and weight of the illumination portion of the system and thus ultimately of the entire projection display.

As discussed in detail below, in accordance with the invention, an unfolded illumination path is achieved for a prism assembly in which illumination light reflects from and image light passes through the assembly's TIR surface by employing in the assembly a prism having 1) an light input face and 2) a TIR face, both of which have (a) two edges which intersect at an angle greater than 90° and (b) two edges which intersect at an angle less than 90°.

Figure 13A:
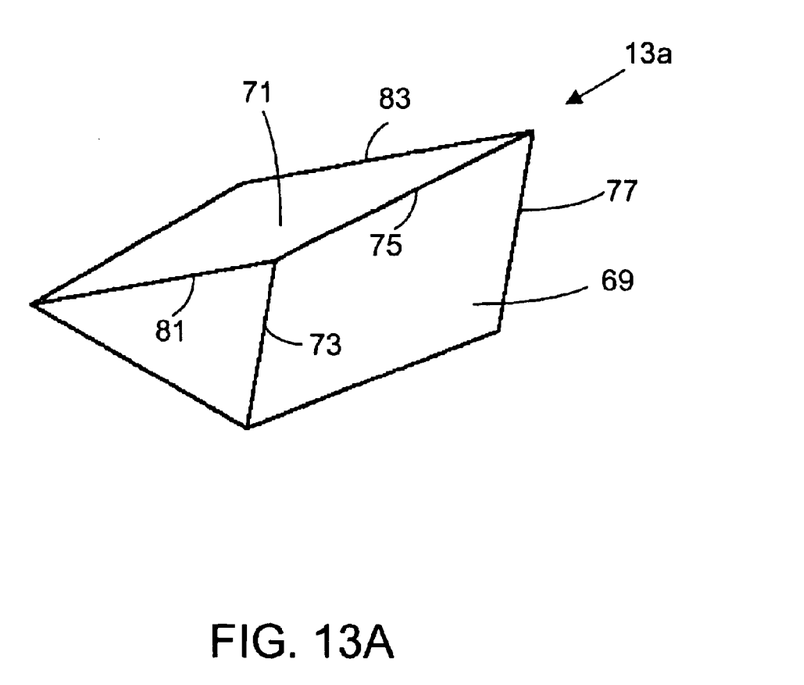
FIG. 13A is an isometric view of the prism of FIG. 12.
Figure 13B:
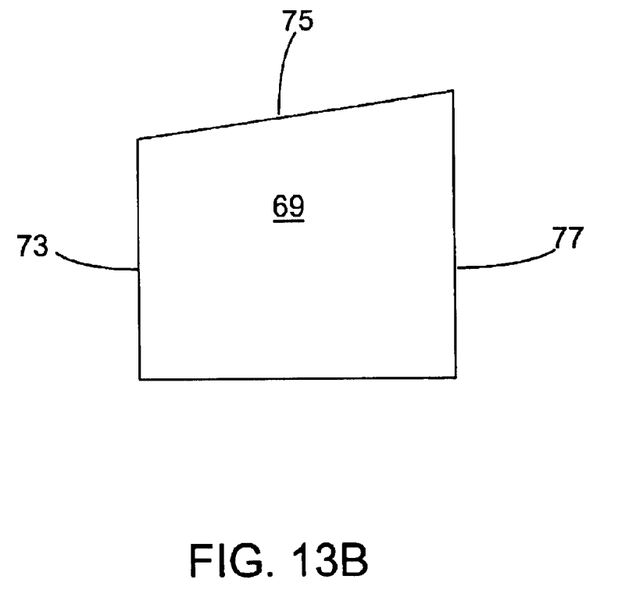
FIGS. 13B and 13C show, respectively, the input and TIR faces of the prism of FIG. 12.
Figure 13C:
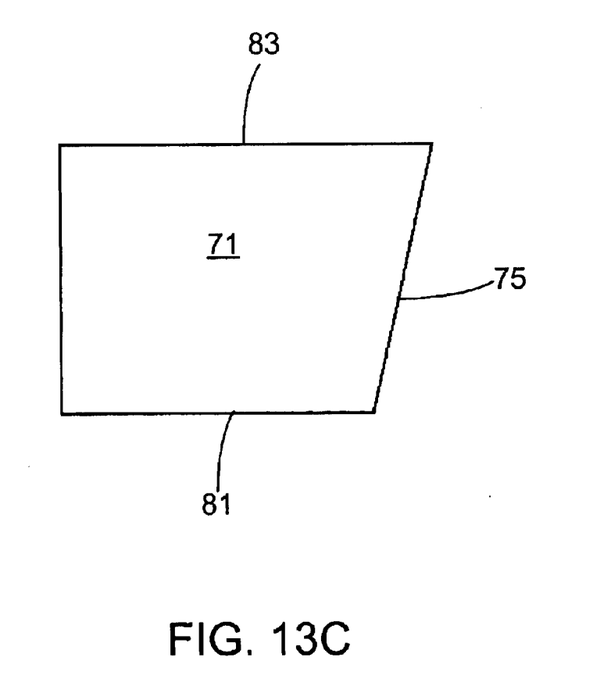

FIG. 13 illustrates such a prism where 69 is the light input face and 71 is the TIR face. The edges of the light input face which meet at an angle greater than 90° are edges 73 and 75, while the edges which meet at an angle less than 90° are edges 75 and 77. The edges of the TIR face which meet at an angle greater than 90° are edges 75 and 81, and the edges which meet at an angle less than 90° are edges 75 and 83.

For this embodiment, the TIR fold works on the illumination path which leaves the imaging path free to exit straight off the device and then pass through the TIR surface. This has the advantage of requiring the shortest possible back focal length from the projection lens, which makes the projection lens, which typically has a telecentric or near telecentric pupil, easier to design. It also allows the imager device to be in roughly the same orientation as the screen, which is an advantage for rear projection type displays.

With this configuration, the illumination path in the TIR prism needs to see a compound angle to set up proper illumination. As discussed in detail below, there are more constraints on this type of prism in that it must satisfy both the reflection criteria for the illumination and must remain properly oriented to fully transmit the entire light cone of the imaging path.

Additional features of the invention are set forth in the detailed description which follows, and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 7 is an isometric close-up of the light engine components of the DMD projection television of FIG. 6. A comparison of this figure with FIG. 2 shows how the invention makes the illumination path simpler in that it no longer has a fold mirror. Also, the total relay length is shorter, which means that the elements can be smaller in diameter and fewer elements may be needed.

The reference numbers used in the drawings correspond to the following:

9 DMD projection system
11 cabinet
13 prism assembly
13a prism associated with imager
13b prism associated with projection lens
15 DMD imager
17 projection lens
19 fold mirror
21 fold mirror
23 screen
25 light source
27 color wheel
29 integrating tunnel
31 relay lens
33 color wheel motor
35 fold mirror
37 relay lens
39 single micro-mirror pixel
41 mirror flipping axis
43 TIR surface reflection
45 illumination direction
47 undesirable light source orientation
49 fold mirror
51 desirable light source orientation
53 horizontal axis of DMD imager
55 illumination axis
57 TIR surface
59 projection of illumination axis
61 illumination light
63 imaging light
65 TIR surface
67 single micro-mirror in its "on" state
69 light input face
71 TIR face
73 edge of light input face
75 edge of light input face and TIR face
77 edge of light input face
81 edge of TIR face
83 edge of TIR face
85 illumination cone
87 imaging cone
89 plane representing the TIR surface
91 ray of the illumination cone most likely to transmit
93 ray of the imaging cone most likely to reflect

DETAILED DESCRIPTION AND PREFERRED EMBODIMENTS OF THE INVENTION

Figure 6A:
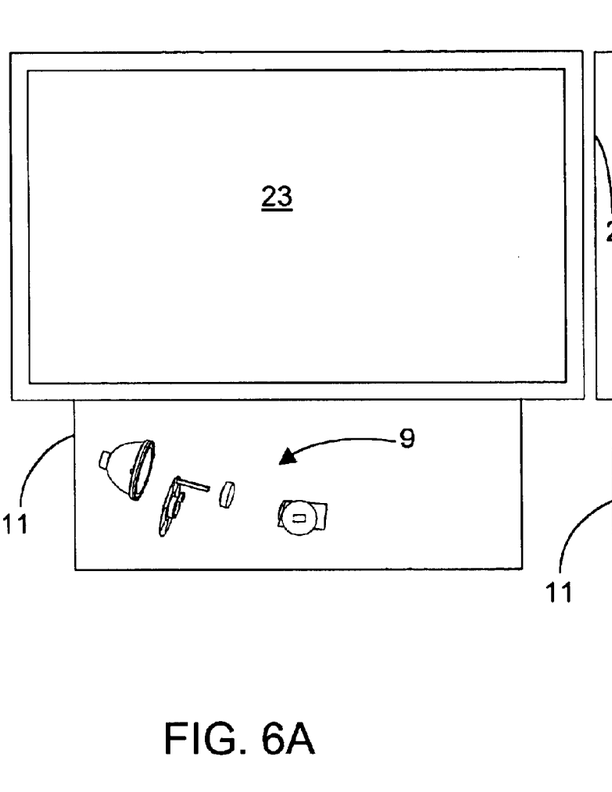
FIGS. 6A and 6B are front and side views, respectively, showing a layout for the components of a DMD rear projection television constructed in accordance with the invention.
Figure 6B:
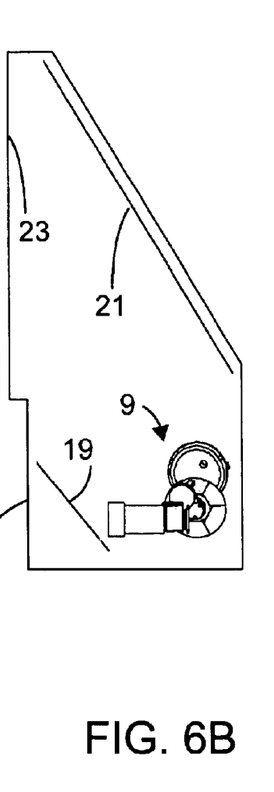
Figure 7:
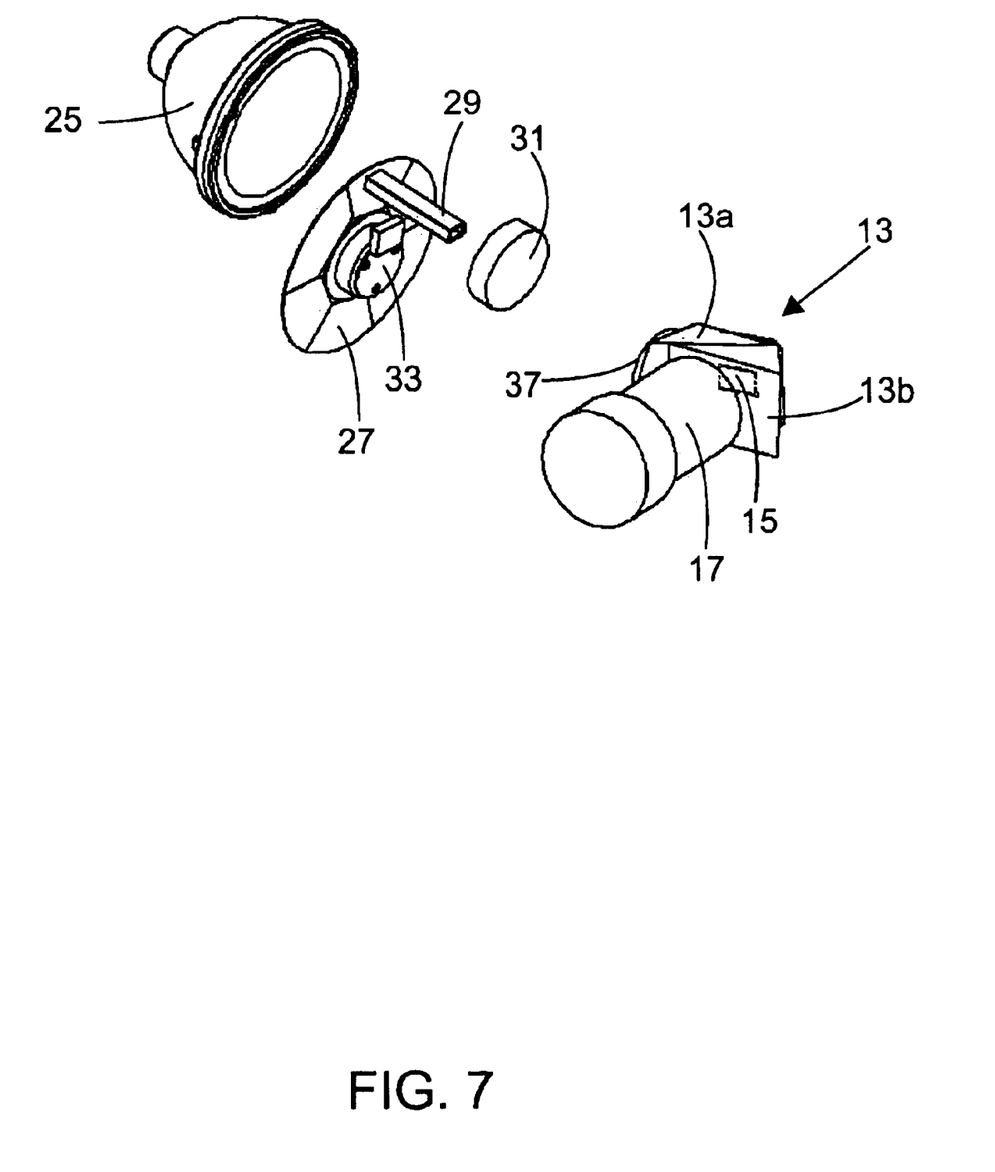

The preferred TIR prisms of the present invention, which reflect illumination light and pass imaging light, have a geometry that is different from that previously used in the art. While still allowing the proper illumination angle, the prisms have a compound angle that permits the rest of the illumination components, in particular, the light source, to sit close to the horizontal of the cabinet and the DMD device without the use of a fold mirror in the illumination path. This substantially horizontal orientation for the light source without the use of a fold mirror is illustrated in FIG. 6 which should be compared with the prior art configuration of FIG. 1 which uses a fold mirror.

In the discussion that follows, two DMD devices will be considered. The first will be the 10° DMD device discussed above in connection with the background of the invention. The second will be the newer DMD device from TEXAS INSTRUMENTS that has mirrors that flip 12° and allows a faster, F/2.4 cone of light. Other DMD devices can, of course, be used in the practice of the invention.

For purposes of illustration, we will assume that the prism is composed of BK7 glass with an index of 1.5168 for the yellow helium d line (587 nm) and 1.5266 for the blue mercury line (436 nm). The critical angle ($\theta_{tir}$) for total internal reflection for n=1.5266 is then:

$\theta_{tir}=\sin^{-1}(1/n)$
$\theta_{tir}=40.92055$, where an index value of 1.5266 is selected to calculate $\theta_{tir}$ to make sure that the TIR surface reflects not just green light, but also blue light.

Other materials besides BK7 can, of course, be used in the practice of the invention.

Figure 8:
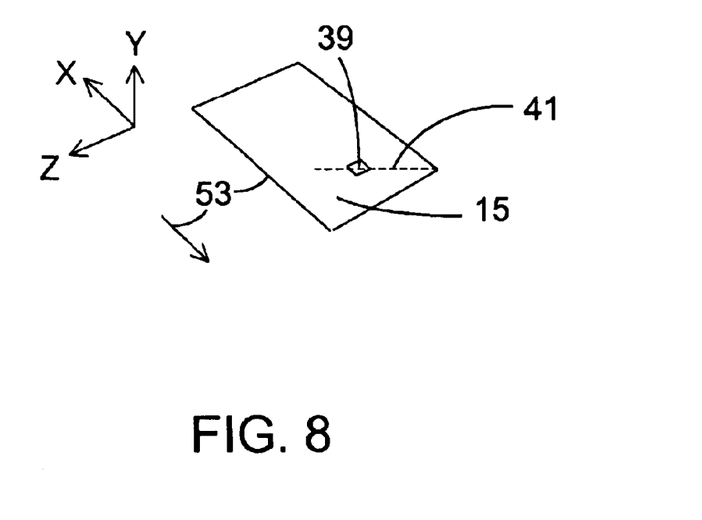
FIG. 8 is a schematic diagram showing coordinate orientation.
Figure 9:
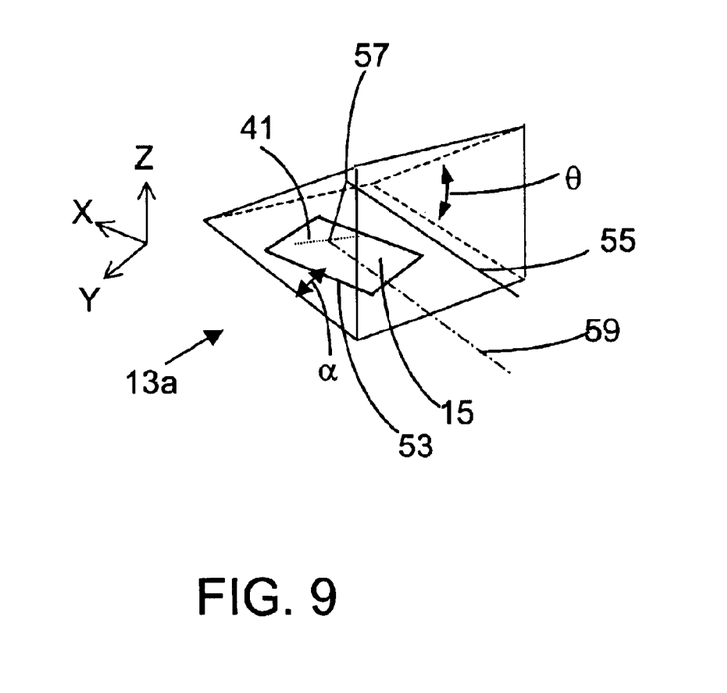
FIG. 9 illustrates the geometric variables of the preferred prisms of the invention.

The coordinate system of FIG. 8 and the angles of FIG. 9 will be used to describe the preferred prisms of the invention. In FIG. 9, $\theta$ is the TIR prism wedge angle and $\alpha$ is the angle that the prism is clocked about the z axis, i.e., the angle that the long edge of the prism (also referred to herein as the "bottom edge" of the prism) makes with the DMD's horizontal axis 53, which, as shown in FIG. 8, is also the x axis. The angle $\alpha$ will be referred to as the "prism face angle." For a conventional (prior art) prism, $\alpha$ is 45°.

In addition to $\theta$ and $\alpha$, the angle $\gamma$ of the illumination axis with respect to the imager horizontal will also be used. For a conventional (prior art) prism, that angle is 45°. For the present invention, the illumination axis and the light source axis (lamp axis) are the same. Accordingly, a 45° angle for the illumination axis is generally unacceptable since the light source axis generally needs to be less than 45° to achieve desirable light source performance. For example, one lamp manufacturer (PHILIPS) specifies that the maximum tilt for the axis of its projection television lamps is 20 degrees. In accordance with the invention, an orientation for the light source axis which is less than 45° is achieved by making the prism face angle compound. In particular, $\theta$, $\alpha$, and $\gamma$ are varied to adjust the compound nature of the TIR surface in order to control the light source angle.

Figure 10A:
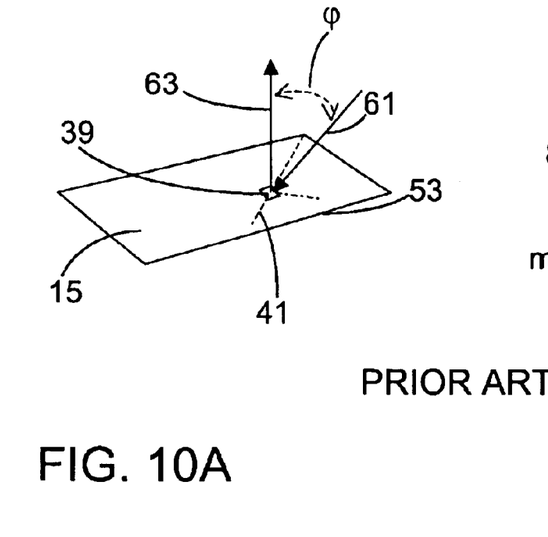
FIGS. 10A and 10B show standard angle designations for a micromirror device.
Figure 10B:
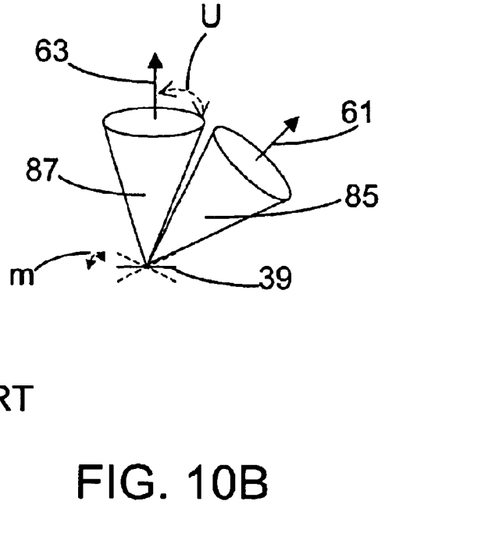

There are some other angles that are commonly used to describe DMD imagers and which play important roles in determining the proper $\theta$, $\alpha$, and $\gamma$ values. These are the illumination insertion angle $\phi$, the mirror flipping angle m, and the f-number light cone angle U. These angles are illustrated in FIGS. 10A and 10B.

Table 1 sets forth values for φ, m, and U for the 10° DMD and 12° DMD embodiments of the invention, as well as for the prior art system using a 10° DMD. These values assume a glass index $n_g$=1.52669. The numerical values of this table, as well as those of Table 2, are, of course, only for purposes of illustration and are not intended to limit the scope of the invention.

Using ray tracing procedures, the orientation of the TIR prism face (specifically, the compound orientation of that face) is selected to achieve a "desirable" orientation for the light source axis while ensuring that all points within the illumination light cone properly reflect from the TIR surface and that all points within the imaging light cone transmit through the surface.

Figure 11:
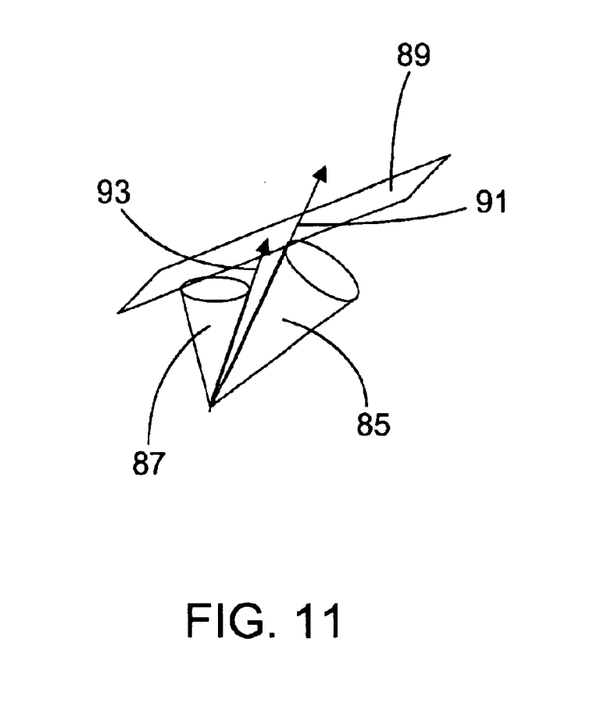
FIG. 11 shows an illumination cone and an imaging cone at a TIR surface.

FIG. 11 shows representative illumination and imaging cones 85 and 87, as well as plane 89 representing the TIR surface. Also shown in this figure are rays 91 and 93, which are, respectively, the ray of the illumination cone most likely to transmit and the ray of the imaging cone most likely to reflect. As plane 89 is rotated through the angle α, rays 91 and 93 move to different locations in their respective cones and change their spatial orientations.

For any arbitrary rotation of the TIR plane through angle α, the resulting angle γ can be determined by ray tracing, as well as appropriate sizes (geometries) for all of the TIR prism's faces. As representative examples, Table 2 gives the results for the 10° DMD and 12° DMD cases and a BK7 prism. In this table, unit vector notation is used to describe the prism face orientations and lamp axis, where the unit vectors [i,j,k] are with reference to the (x,y,z) axes shown in FIG. 8.

Figure 12:
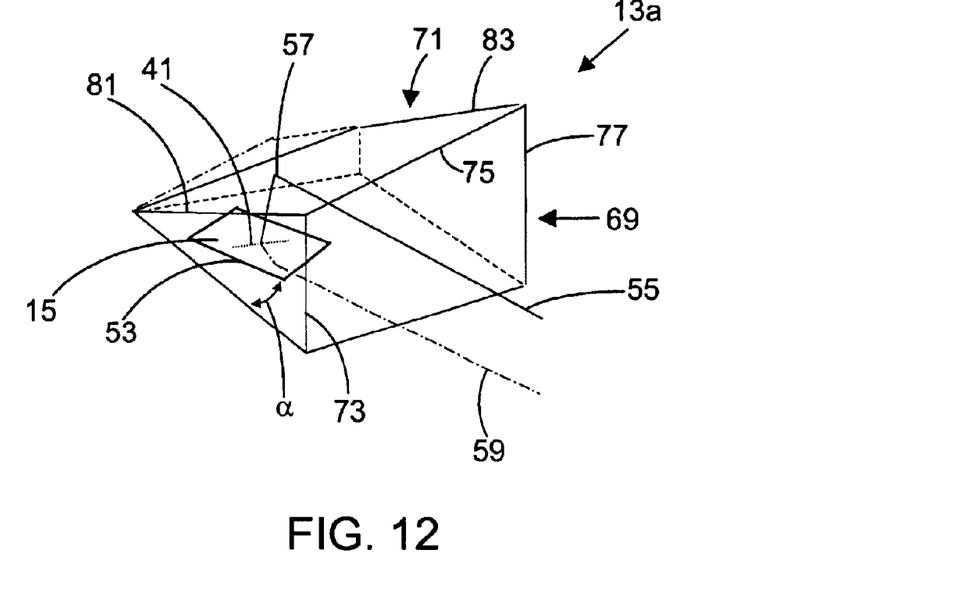
FIG. 12 shows a prism constructed in accordance with the invention.

FIG. 12 shows the resulting prism for the 12° DMD case. Further views of this prism are shown in FIG. 13. Also, FIG. 14 shows the prism incorporated in a complete prism assembly, and for comparison, FIG. 15 shows a prior art prism assembly.

As in FIGS. 4 and 9, the illumination path is projected down onto the plane of the DMD in FIG. 12. Because the TIR face is at a compound angle, this projection includes a kink, as can be seen in FIG. 12. It should be noted that in FIG. 12, the prism face angle α is less than the standard 45° (e.g., for the 12° DMD case of Table 2, α is 5°). Similarly, the light source (lamp) angle γ is less than 45° (e.g., for the 12° DMD case of Table 2, γ is 16°).

Figure 14A:
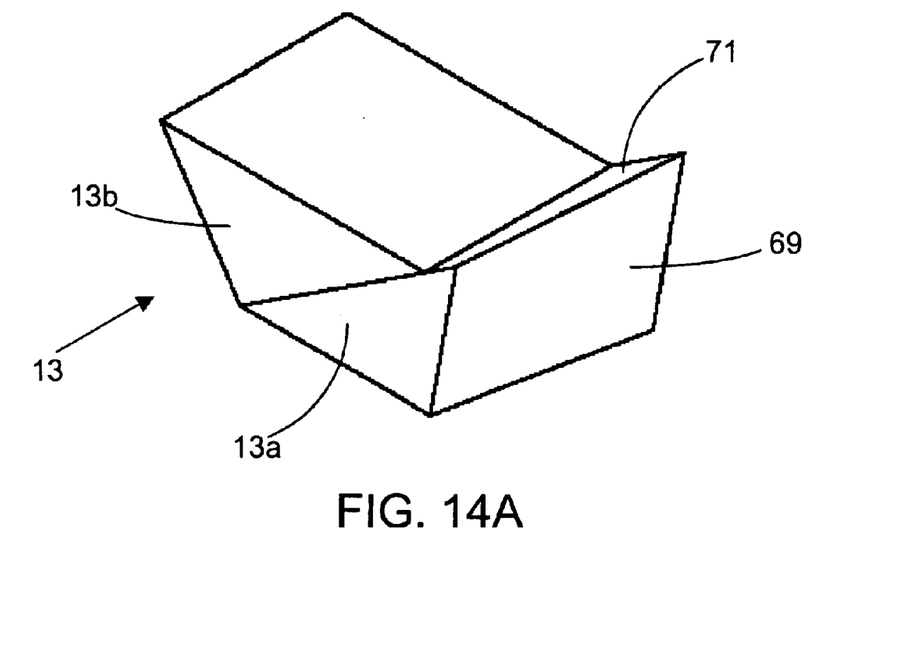
FIGS. 14A and 14B are isometric and side views, respectively, of a prism assembly employing the prism of FIG. 12.
Figure 14B:
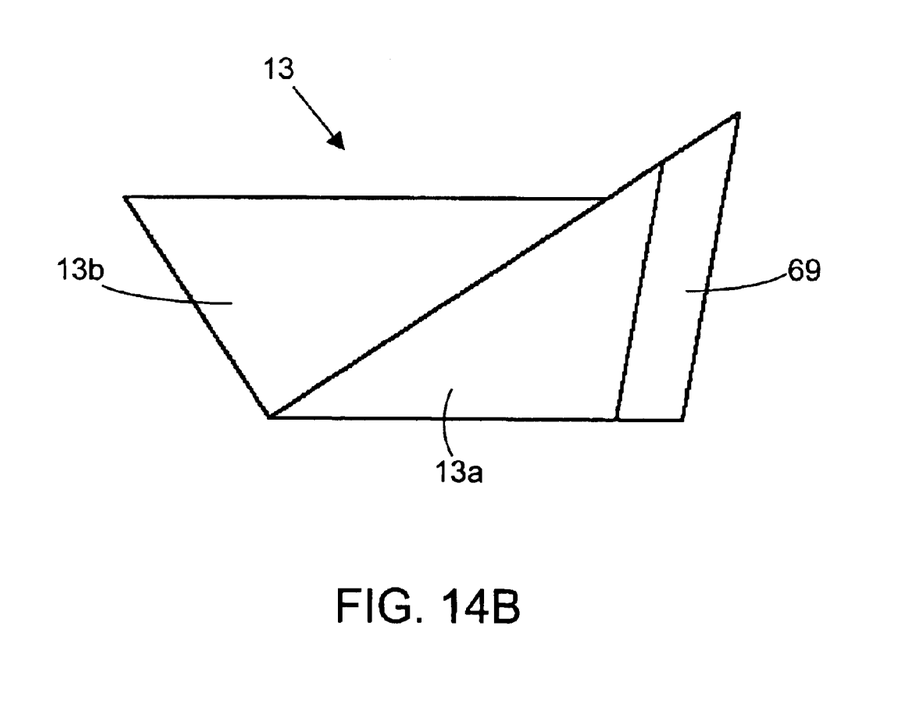
Figure 15A:
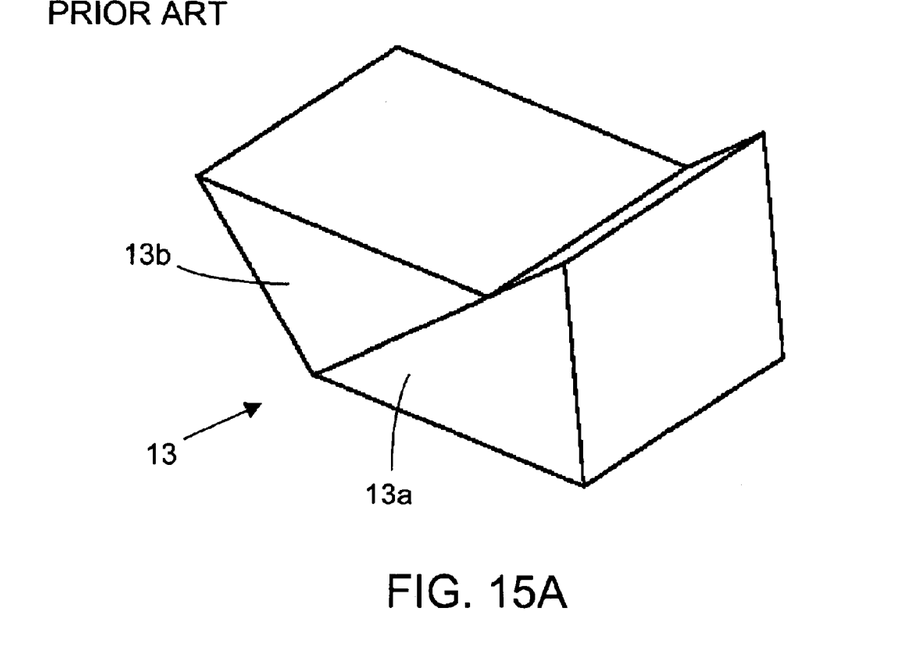
FIGS. 15A and 15B are isometric and side views, respectively, of a prior art prism assembly in which the prism face is oriented at 45° to the horizontal axis of the DMD imager.
Figure 15B:
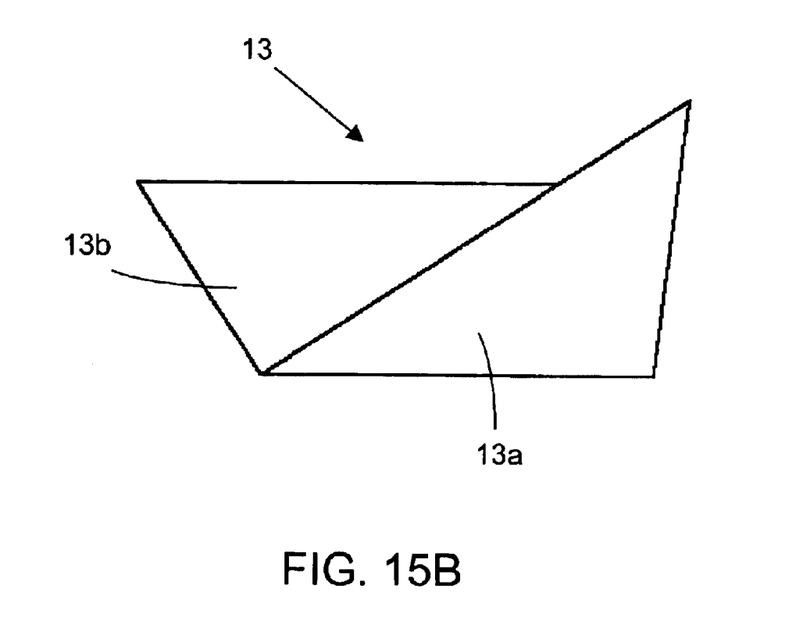

The compound prism of FIGS. 12, 13, and 14 gives an illumination that correctly inserts onto the micromirror pixel (e.g., at 26.5° and coming from 45°), but because the TIR face is at a compound angle, the illumination can come into the prism directly along the angle that we have described as the light source or lamp axis angle γ, without the need for any fold mirrors. In particular, for the prisms of the invention, γ is different from (less than) the standard 45° to the device horizontal. For example, as illustrated in Table 2, γ can be less than or equal to about 20° which means that the lamp axis can lie directly along γ and operate effectively without the use of fold mirrors.

In summary, in the prior art, the illumination systems used with DMDs had a fold mirror and typically from 2 to 4 lens elements. The fold mirror was used to help make the packaging compact and also permitted the arc-lamp to be positioned at its preferred operating axis, i.e., near horizontal. Before the present invention, it was not possible to use an even simpler illumination system that avoided all fold mirrors, because without a fold mirror, the DMD device and the TIR prism put the axis of the lamp at 45 degrees to the horizontal of the device (and the cabinet).

This present invention addresses this problem by providing a prism face with a compound fold which yields a simplified illumination path. That is, the prism folds the illumination light so that the illumination relay optics requires no fold mirrors at all, and the lamp can be at or near horizontal without any additional folding. The illumination system is thus simpler and has an overall shorter length. Moreover, as can be seen by comparing FIG. 6 with FIG. 1, the invention simplifies the layout of the illumination elements in the projection box.

Although specific embodiments of the invention have been described and illustrated, it is to be understood that modifications can be made without departing from the invention's spirit and scope. For example, in the foregoing discussion, the projection components have been positioned in the rear projection box with the DMD device and the projection lens pointing forward towards the screen. Two cabinet fold mirrors have thus been used to place the image on the screen. The invention also can be efficiently used in a single fold cabinet, with the lens and DMD device pointing up. In this case, prior art illumination systems operating at γ=45° would push the lamp either very deep in the cabinet or forward of the screen plane. With the invention, the lamp axis can be 20 or less, and the overall cabinet depth can be controlled.

As another variation, the invention can be used in systems which employ more than one DMD (see, for example, FIGS. 16 and 17 of Atobe et al., U.S. Pat. No. 5,999,306). For example, a color separating/combining prism assembly can be used with 2 or 3 DMDs, with a TIR prism placed in front of that assembly. In the prior art, such a TIR prism would be oriented at 45 degrees to the DMD devices, and the illumination system would have a fold mirror to re-position the lamp. With the TIR prism of the present invention, the fold mirror can be eliminated.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

TABLE 1

|  | Present Invention 10° DMD | Present Invention 12° DMD | Prior art (FIG. 5A) 10° DMD |
| --- | --- | --- | --- |
| Device mirror angle m | 10° | 12° | 10° |
| Illumination insertion angle φ | 22.5° | 26.5° | 20° |
| FNO light cone (FNO & [half angle, U°]) | 3.0 [9.6°] | 2.5 [11.54°] | 3.0 [9.6°] |

TABLE 2

|  | Present Invention 10° DMD | Present Invention 12° DMD | Prior art (FIG. 5A) 10° DMD |
| --- | --- | --- | --- |
| Prism TIR wedge θ | 34.65° | 33.0° | 34.5° |
| Prism face angle α | 12.5° | 5.0° | 45° |
| Lamp axis angle γ | 20.16° | 16.08° | 45° |
| Vector orientation of TIR face | [.555, −.123, .823] | [.543, −.047, .8.39] | [.401, −.401, .824] |
| Vector direction of lamp axis | [.928, −.3408, .149] | [.995, −.271, .184] | [.700, −.700, .14] |

What is claimed is:

1. Apparatus for producing an image on a screen comprising:
    (A) a light source which produces illumination light;
    (B) a panel which selectively reflects illumination light to produce image light, said panel comprising a plurality of selectively adjustable reflecting elements arranged in a common plane, said elements being adjustable between at least a first position and a second position;
    (C) a projection lens which receives image light and produces the image on the screen; and
    (D) a prism assembly which transmits illumination light from the light source to the panel and transmits image light from the panel to the projection lens, said prism assembly comprising a prism which comprises:
        (I) a first face which receives illumination light from the light source;
        (II) a second face at which illumination light which has been transmitted by the first face undergoes total internal reflection; and
        (III) a third face which transmits illumination light which has reflected from the second face to the panel;
    wherein:
        (a) the second and third faces transmit image light which has reflected from the panel to the projection lens; and
        (b) the first face and the second face each comprises:
            (i) two edges which intersect at an angle greater than 90°, and
            (ii) two edges which intersect at an angle less than 90°.

2. The apparatus of claim 1 wherein:
    (i) the light source defines a light source axis;
    (ii) the panel defines a horizontal axis; and
    (iii) the angle between the light source axis and the horizontal axis is less than or equal to about 20°.

3. The apparatus of claim 1 wherein:
    (i) the third face has a bottom edge;
    (ii) the panel defines a horizontal axis; and
    (iii) the angle between the bottom edge and the horizontal axis is less than 45°.

4. A rear screen projector comprising:
    (i) the apparatus of claim 1;
    (ii) a cabinet which houses the apparatus of claim 1; and
    (iii) a screen carried by the cabinet upon which the image formed by the apparatus of claim 1 is displayed.

5. The apparatus of claim 1 wherein the apparatus comprises a two element relay between the light source and the prism assembly.

6. Apparatus for producing an image on a screen comprising:
    (A) a light source which produces illumination light;
    (B) a panel which selectively reflects illumination light to produce image light, said panel comprising a plurality of selectively adjustable reflecting elements arranged in a common plane, said elements being adjustable between at least a first position and a second position;
    (C) a projection lens which receives image light and produces the image on the screen; and
    (D) a prism assembly which transmits illumination light from the light source to the panel and transmits image light from the panel to the projection lens, said prism assembly comprising:
        (I) a face which receives illumination light from the light source;
        (II) a face which transmits illumination light to the panel and receives image light reflected from the panel; and
        (III) a face which transmits image light to the projection lens;
    wherein:
        (a) the prism assembly comprises at least one surface at which total internal reflection occurs; and
        (b) the optical path between the light source and the face which receives illumination light from the light source is unfolded.

7. The apparatus of claim 6 wherein the at least one surface directs illumination light to the panel.

8. The apparatus of claim 5 wherein:
    (i) the light source defines a light source axis;
    (ii) the panel defines a horizontal axis; and
    (iii) the angle between the light source axis and the horizontal axis is less than or equal to about 20°.

9. The apparatus of claim 6 wherein:
    (i) the face which transmits illumination light to the panel and receives image light reflected from the panel has a bottom edge;
    (ii) the panel defines a horizontal axis; and
    (iii) the angle between the bottom edge and the horizontal axis is less than 45°.

10. A rear screen projector comprising:
    (i) the apparatus of claim 6,
    (ii) a cabinet which houses the apparatus of claim 5; and
    (iii) a screen carried by the cabinet upon which the image formed by the apparatus of claim 5 is displayed.

11. The apparatus of claim 6 wherein the apparatus comprises a two element relay between the light source and the prism assembly.

12. A method for producing an image on a screen comprising:
    (a) transmitting illumination light from a light source to a prism assembly without turning the direction of propagation of said light;

(b) transmitting said illumination light through the prism assembly and to a panel comprising a plurality of selectively adjustable reflecting elements arranged in a common plane, said elements being adjustable between at least a first position and a second position;

(c) forming image light from said illumination light at the panel;

(d) transmitting the image light through the prism assembly and to a projection lens; and (e) transmitting the image light through the projection lens to form the image.

13. The method of claim 12 wherein in step (b), the illumination light undergoes total internal reflection.

14. The method of claim 12 wherein the image light is transmitted between the prism assembly and the projection lens without turning the propagation direction of said light.

15. The method of claim 12 wherein the image light is transmitted between the panel and the projection lens without turning the propagation direction of said light.

16. The method of claim 12 wherein in step (a), the illumination light is transmitted from the light source to the prism assembly by a two element relay.

* * * * *

UNITED STATES PATENT AND TRADEMARK OFFICE
CERTIFICATE OF CORRECTION

PATENT NO. : 6,726,332 B2
DATED : April 27, 2004
INVENTOR(S) : Cannon, Bruce L.

It is certified that error appears in the above-identified patent and that said Letters Patent is hereby corrected as shown below:

Column 8,
Line 31, delete "20" and insert -- 20° --, therefore.

Column 10,
Lines 42, 57 and 59, delete "claim 5" and insert -- claim 6 --, therefore.

Signed and Sealed this

Twenty-third Day of November, 2004

JON W. DUDAS
*Director of the United States Patent and Trademark Office*